United States Patent [19]

Ligh

[11] Patent Number: 5,474,351
[45] Date of Patent: Dec. 12, 1995

[54] SERVICE MANIFOLD FOR TANK BLANKETING AND VENTING VALVES

[76] Inventor: Jone Y. Ligh, P.O. Box 420509, Houston, Tex. 77242-0509

[21] Appl. No.: 270,746

[22] Filed: Jul. 5, 1994

[51] Int. Cl.$^6$ .................................................. F16L 47/00
[52] U.S. Cl. ........................... 285/131; 285/286; 285/363
[58] Field of Search ................................... 285/131, 150, 285/132, 286, 363

[56] References Cited

U.S. PATENT DOCUMENTS

| | | | |
|---|---|---|---|
| 165,724 | 7/1875 | Gibson | 285/132 X |
| 892,151 | 6/1908 | Hanlon | 285/132 X |
| 1,064,001 | 6/1913 | O'Dowd | 285/132 X |
| 1,304,197 | 5/1919 | Nyquist | 285/131 |
| 1,321,235 | 11/1919 | McCann | 285/131 X |
| 2,588,983 | 3/1952 | Johnson | 285/132 |
| 4,103,936 | 8/1978 | Sutcliffe et al. | 285/131 X |
| 4,718,568 | 1/1988 | Palu | 285/131 X |
| 4,991,620 | 2/1991 | Ligh | 137/489 |
| 5,067,522 | 11/1991 | Ligh | 137/625.33 |

FOREIGN PATENT DOCUMENTS 2204102  11/1988  United Kingdom ................... 285/131

OTHER PUBLICATIONS

Appalachian Control Co., "Meeting EPA Emission Standard with Pad-Depad Tank Blanketing" 1991.
Fisher Controls, "Gas Blanketing and Vapor Recovery. Savings and Safety", Nov. 1991.
Appalachian Control Co. "General Sales Info. Single Array Manifold (SAM) Unit", Feb. 1989.
Anderson, Greenwood & Co. "AGCO Trans-Zero Regulators for Tank Blanketing Service" Catalog 7000 Feb. 1982.

*Primary Examiner*—Dave W. Arola
*Attorney, Agent, or Firm*—Kenneth H. Johnson

[57] ABSTRACT

A manifold with provisions for blanket gas entry, vapor exhaust, and sensing port(s) for mounting on a single nozzle on the tank comprising a special tee and a flow pipe with connections on the tee to suit the mating equipment (flanges, thread, or a combination thereof).

4 Claims, 4 Drawing Sheets

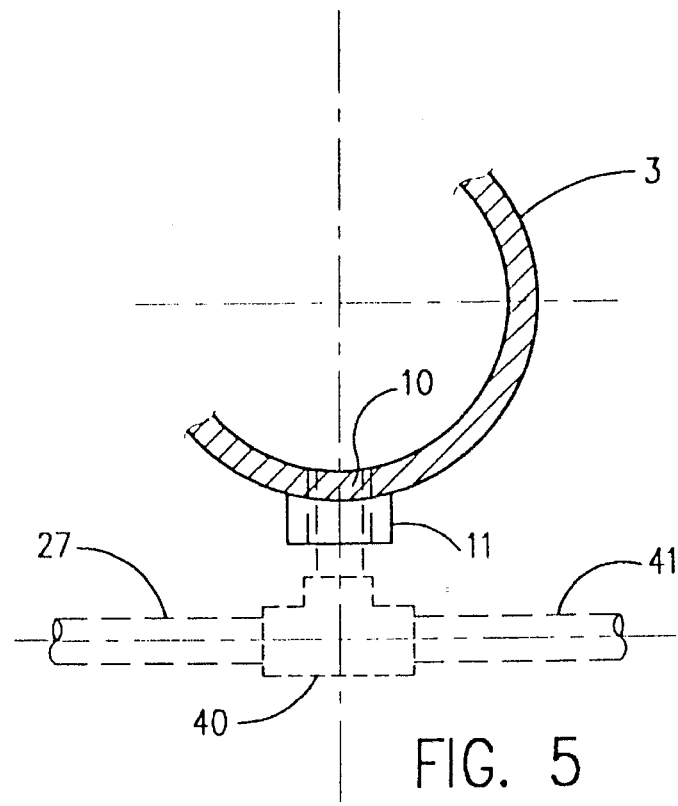
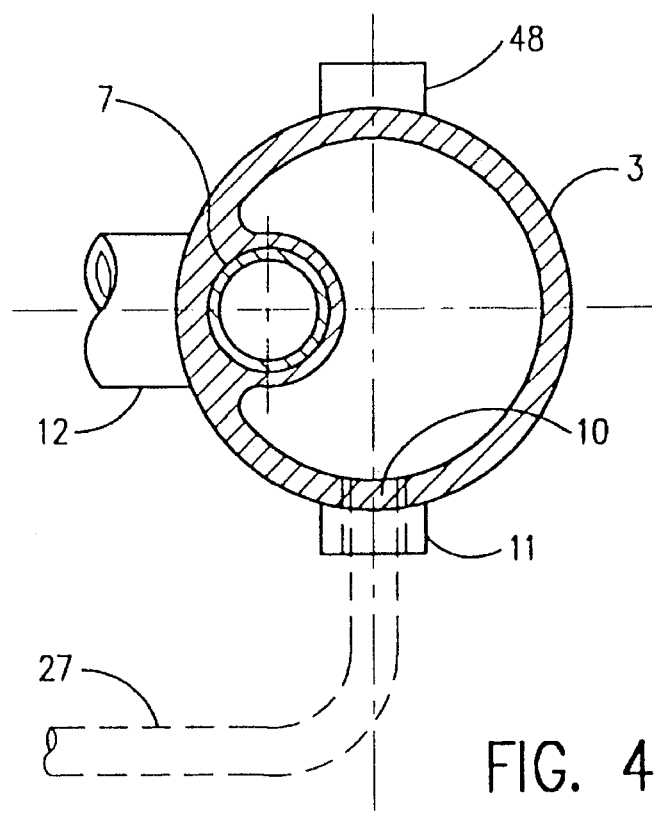

5,474,351

SERVICE MANIFOLD FOR TANK BLANKETING AND VENTING VALVES

BACKGROUND OF THE INVENTION

1. Field of the Invention

The present invention relates to a manifold for use on storage tanks to allow for dual use of a single port.

2. Related Art

Most liquid storage tanks must have a pressure relieving device installed to protect the tank from being overpressurized. Additionally, many storage tanks are "blanketed", usually with one or more types of gas, for one of several reasons: (1) to prevent the entrance of atmospheric air which contains oxygen, moisture, and other contaminants that could cause internal tank corrosion and degradation of the stored product, (2) to dilute the oxygen content in the tank so that the vapors are below the flammable range (too lean to burn), (3) to enrich the vapors so that they are above the flammable range (too rich to burn), (4) to dilute toxic vapors for safer emission levels, (5) to prevent the collapse of the tank when atmospheric thermal conditions tend to cool the tank walls and cause a drop in internal pressure, and for other reasons.

Some tanks have a vapor recovery system whereby the vapors are piped to a recycling compressor and returned to a liquid state. All of the above described systems require an entry and an exit to the tank. Two ports are usually used in addition to separate ports for pilot sense lines and accessory equipment. Some systems use one port for both the entry and exit.

Some systems use one port on the tank for both the entry of the blanket gas and the outlet for the vapors to the vapor recovery system. Another approach is the use of two ports on a tank for blanketing, one port for blanket gas entry and one port for the control line.

A system previously used by the present inventor provides for a blanket gas entrance and a sensing point through the same nozzle on the tank. There are no provisions for venting the vapors.

Some of the prior systems can perform two of the three needed functions, but have no provisions to exhaust the tank vapors. Other prior systems can accommodate both blanket gas entry and vapor exhaust but the tee is not a good location for sensing tank pressure. Additionally, if a "weight loaded" exhaust valve is used for vapor recovery, with the prior systems it can open prematurely (before the actual set point is reached) because the potential exists for the blanket gas to enter the tee at a much higher pressure than the set pressure of the exhaust valve, thus causing the exhaust valve to open prematurely.

It is an advantage of the present invention that the manifold can accommodate (1) the entry of the blanket gas, (2) the exhaust of the vapors, and (3) sensing point(s) to pick up the true tank pressure, all available in a single unit for mounting on a single port on the tank.

SUMMARY OF THE INVENTION

The current invention is in a manifold with provisions for blanket gas entry, vapor exhaust, and sensing port(s) for mounting on a single nozzle on the tank. It comprises a special tee and a flow pipe with connections on the tee to suit the mating equipment (flanges, thread, or a combination thereof).

Briefly the present invention is a service manifold comprising: a substantially linear main conduit having an entry and an exit at opposite ends thereof and an auxiliary conduit extending internally into said main conduit intermediate of said entry and said exit, said conduit defining an arcuate surface within said main conduit and extending toward the entry of said main conduit and beyond said entry.

The purpose of the internal conduit is to provide an entry for the tank blanketing gas. The sizing of the internal conduit for this use is to allow the blanketing gas to enter at a reasonable velocity, but at the same time the internal conduit is kept as small as possible in order to leave the main conduit open for emergence pressure relief from the tank. Preferably the internal conduit has a cross sectional area of less than 50% of said main conduit.

BRIEF DESCRIPTION OF THE DRAWINGS

FIG. 4 is a top cross sectional elevational view of one embodiment of the present manifold with a single sense line.

FIG. 5 is a top cross sectional elevational view of one embodiment of the present manifold with dual sense lines.

PREFERRED EMBODIMENT

Figures 1, 2:
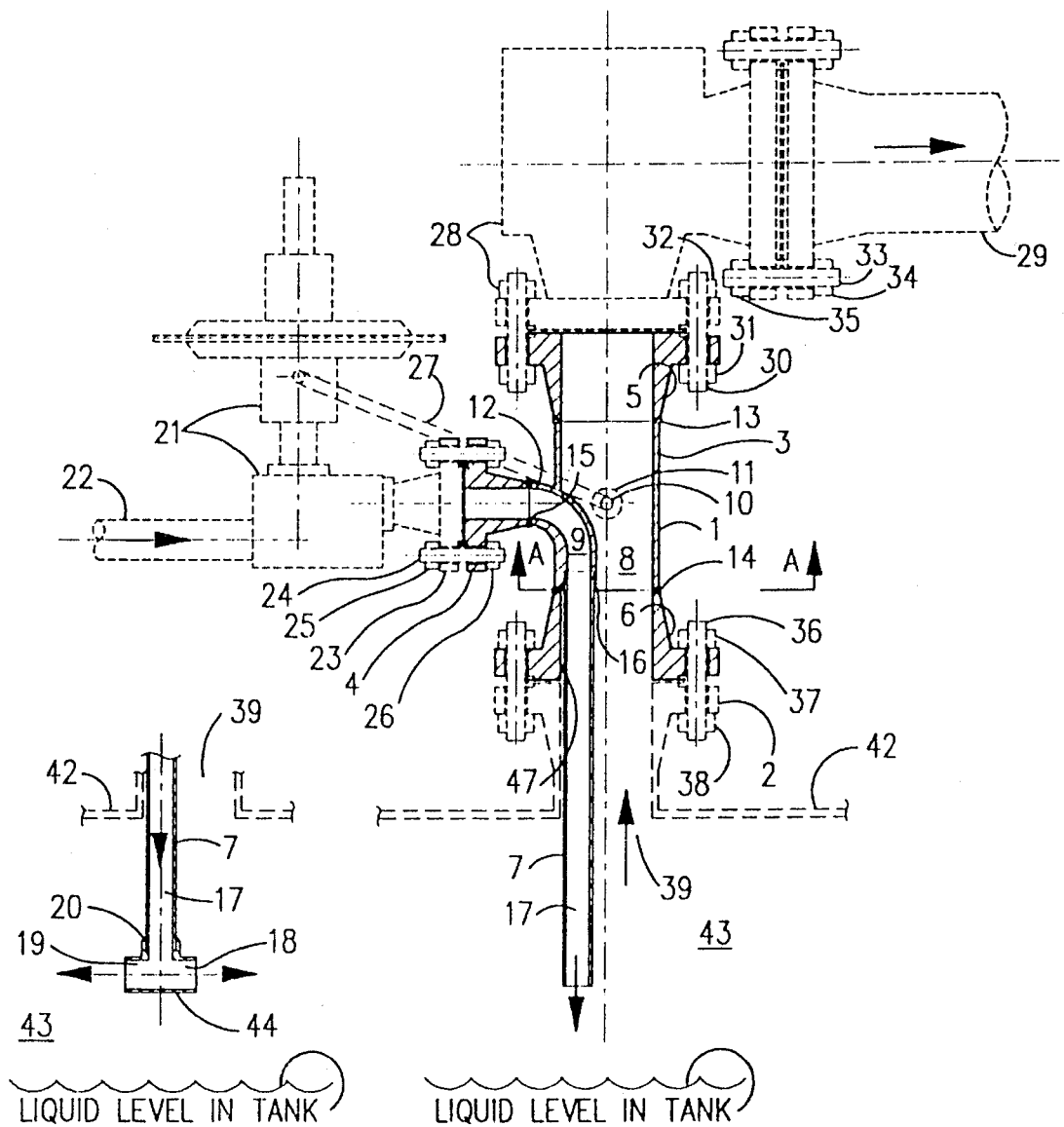
FIG. 1 is a cross sectional elevational view of one embodiment of the present manifold.
FIG. 2 is a cross sectional view of a detail of one embodiment of a gas inlet.

Referring to FIG. 1, the manifold 1 comprises a tee 3, flange 4, flange 5, flange 6, and flow pipe 7. Tee 3 along with flanges 5 and 6 form passageway 8. Elbow 12 and flange 4 form passageway 9. Elbow 12 and flow pipe 7 form passageway 17 flowing into the tank. Port 10 is a sensing port extending into passageway 8. Boss 11 is part of the tee 3 and provides a connection for sense lines 27 and 41 (FIG. 5). Boss 48 on tee 3 (FIG. 4) is an optional boss for additional control if so desired. Welds 13, 14, and 15 join the tee 3 to the elbow 12. Threaded connections (not shown) may be substituted for flanges 4, 5, and 6. Furthermore, tee 3, flange 4, and flange 5 may be cast as a single piece if so desired. The entire manifold can be fabricated as well. Because of the welding of flow pipe 7 onto the elbow 12, it is easier to perform the welding without flange 6 getting in the way. After flow pipe 7 is attached flange 6 may be welded. Flow pipe 7 may also be welded to flange 6 at weld 47 for added rigidity. The length of flow pipe 7 is dependent upon the height of nozzle 2 above the tank roof 42 since the object is to get the blanket gas to discharge into the tank below the roof 42 where it can dissipate rapidly. In this fashion the pressure in passageway 8 will be substantially the same as the pressure in vapor space 43.

Referring to FIG. 2 the passageway 17 may terminate in a tee 44 which forms passageways 18 and 19 that are equal and opposite to each other. One advantage of the tee 44 is that pressure flowing out of a tee with ports that are equal and opposite to each other will cause less stress in flow pipe 7 and welds 16 and 47 since the forces of the discharging pressure are equal and opposite which will negate each other.

Figure 3:
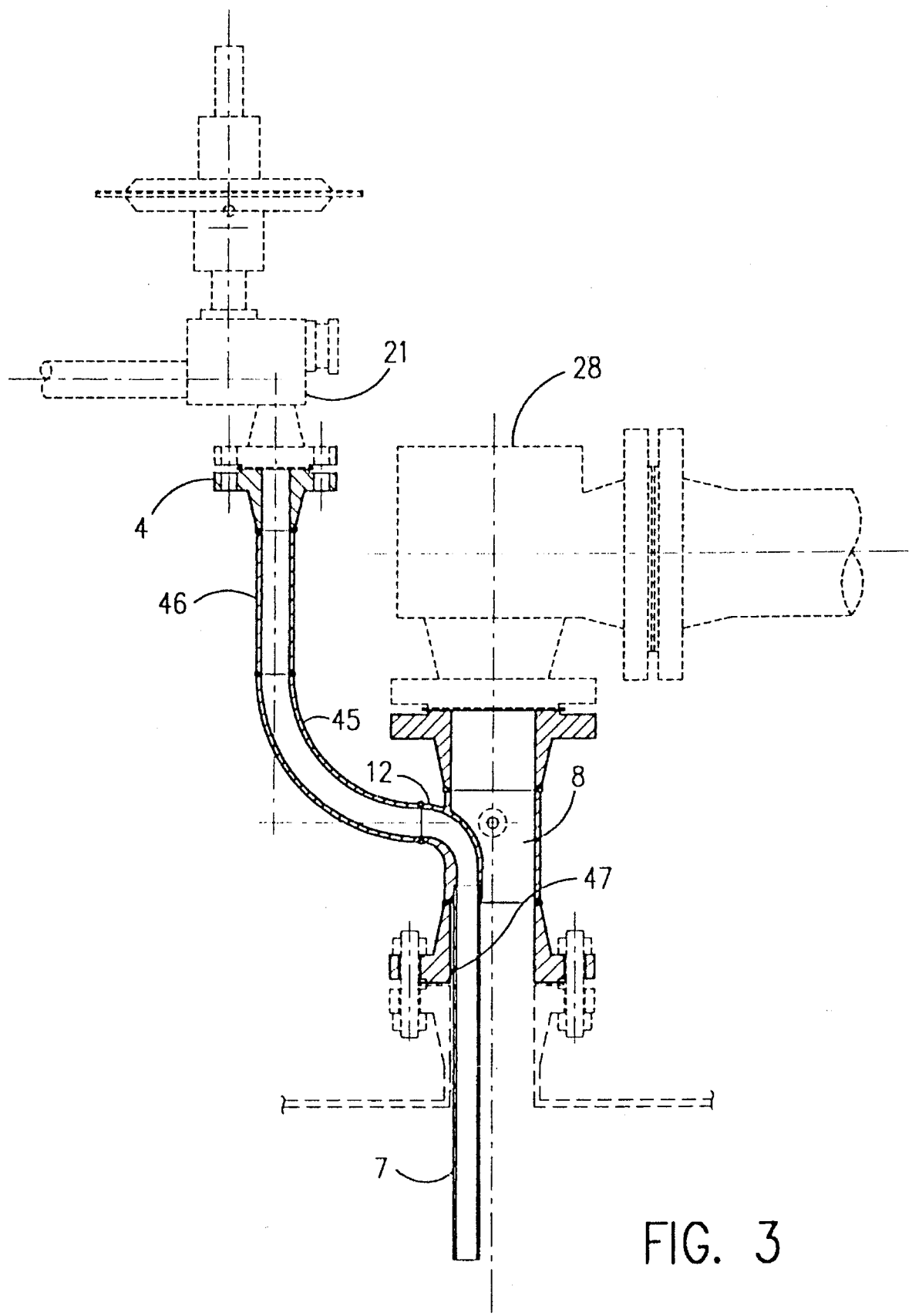
FIG. 3 is a cross sectional elevational view of an alternate embodiment of the present manifold.

Referring to FIG. 3 it is desirable for some installations to place the blanketing valve above the vent valve so that in the event the tank is overfilled the liquid product will spill out of the vent valve and not get into the blanketing valve to cause potential problems. In this case elbow 45 is attached to elbow 12 with extension pipe 46 attached to elbow 45 and flange 4 to extend along an arcuate curve in along a generally parallel axis to the passageway 8.

Figure 6:
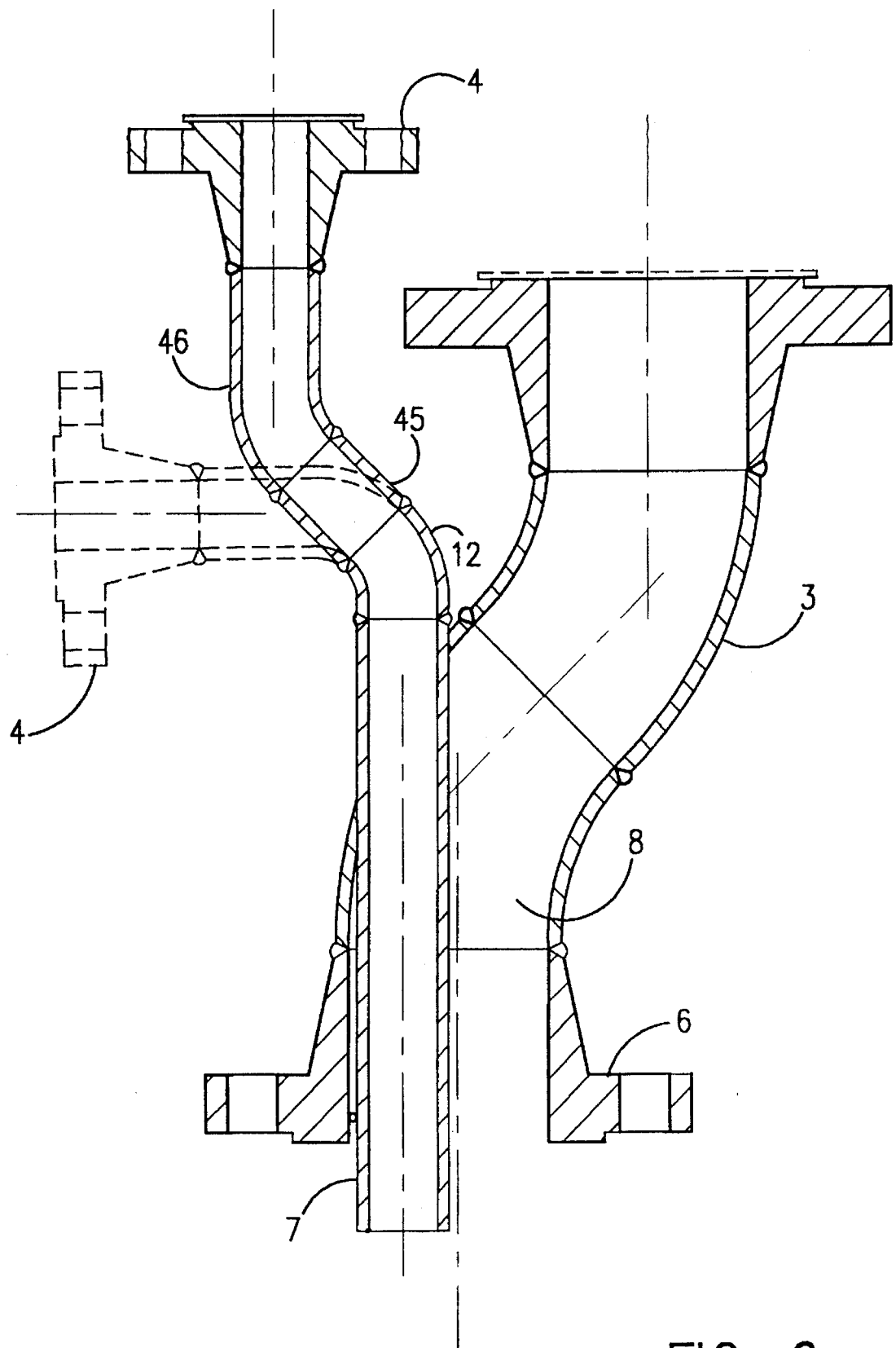
FIG. 6 is a cross sectional elevational view of an alternate embodiment of the present invention.

Referring to FIG. 6 the main tee 3 is shown to be curved. This may be desirable depending on the size of the blanketing valve and/or the pressure relieving device. The particular configuration shown may be more compact, more rigid and/or easier to fabricate. The blanketing valve can either be mounted as shown in FIG. 6 or as shown in FIG. 1.

In FIG. 1, FIG. 3 and FIG. 6 the object is to keep passageway 8 as smooth and large as possible to minimize the pressure drop of the fluid when it flows along passageway 8 and out the vent valve 28. Abrupt bends or turns in passage 8 should be avoided. Short gradual turns are permissible. The reason for low pressure drops is to enhance the operation of the vent valve 28 and to avoid the need for oversizing the vent valve. It is recognized that flow pipe 7 and elbow 12 block a portion of the cross sectional area of passageway 8 for venting purposes. This needs to be taken into consideration when sizing the vent valve and choosing the size of manifold 1.

The key to any of the manifolds shown in FIG. 1, FIG. 3 or FIG. 6 is the pressure drop along the manifold between the flange at the lower end for mounting to the tank nozzle and the flange at the upper end for mounting the pressure relieving device. Ideally the pressure drop from the tank connection to the relieving device connection should not be greater that three percent (3%) in order to avoid the need to oversize the pressure relieving device. See ASME Section VIII, Division 1 of the Unfired Pressure Vessel Code. Although the ASME Section VIII currently deals with vessels with a design pressure greater than 15 psig it is a prudent practice to apply the three percent rule to pressure vessels designed for operating below 15 psig as well. Because minimum pressure drop is desired through the manifold for pressure relieving, and because the lower end of the manifold is partially obstructed by the pipe for the blanket gas, the lower flange and pipe size will usually be slightly larger than the flange and pipe size at the upper end for mounting the pressure relieving device.

Pressure drop along the blanket gas entry pipe is not as critical since the blanket gas entry pressure is much higher than the set pressure of the relieving device.

OPERATION OF THE MANIFOLD

Normally the set pressure of the vent valve 28 is higher than the set pressure of the blanketing valve 21. Under normal operation each valve may open intermittently but both valves are not open at the same time unless one or both blanketing valve 21 and/or vent valve 28 fails in the open position.

Referring to FIG. 1 the blanket gas enters the blanketing valve 21 via conduit 22. Conduit 27 senses the pressure of vapor space 43 at port 10 and relays the pressure to the pilot of blanketing valve 21. If the pressure sensed is equal to or greater than the set pressure of the blanketing valve 21 the blanketing valve 21 will remain closed. When the vapor space 43 pressure drops below the set pressure of blanketing valve 21 the blanketing valve 21 will open and discharge blanket gas into the tank via passageway 9, flow pipe 7 and passageway 17 (plus passageways 18 and 19 in FIG. 2). When pressure in the vapor space 43 reaches the set pressure of blanketing valve 21 the blanketing valve 21 will close.

When pressure in the vapor space 43 reaches the set pressure of the vent valve 28 (either via conduit 41 if the vent valve is pilot operated or directly via passageway 8 if the vent valve 28 is weight or spring operated) vapor pressure will be vented through passageway 39 at the tank nozzle, along passageway 8, out through vent valve 28, and conduit 29. If the vapors are not piped away conduit 29 is not required and the vapors discharge directly into the atmosphere through vent valve 28. When sufficient pressure in vapor space 43 has been vented and the vapor space pressure falls to or below the reseat point of vent valve 28 the vent valve 28 will close.

I claim:
1. A service manifold comprising:
    a substantially linear main conduit having an entry end and an exit end at opposite ends thereof and
    an auxiliary conduit having a first portion located externally of said main conduit and a second portion extending internally into said main conduit intermediate of said entry and said exit ends, said auxiliary conduit second portion defining an axial arcuate surface within said main conduit and extending toward the entry of said main conduit and beyond said entry end, said second portion being positioned adjacent to a wall of the main conduit and having a cross sectional area of less than 50% of said main conduit, said second portion of said auxiliary conduit being linear throughout the length thereof.
2. The service manifold according to claim 1 wherein at least a portion of said auxiliary conduit first portion extends to substantially parallel to said main conduit.
3. The service manifold according to claim 2 wherein said auxiliary conduit extends beyond the exit end of said main conduit.
4. The service manifold according to claim 1 wherein said auxiliary conduit and said main conduit are substantially cylindrical.

* * * * *